US008442937B2

(12) United States Patent
Gabriel et al.

(10) Patent No.: US 8,442,937 B2
(45) Date of Patent: May 14, 2013

(54) ACCESS TO LINE-OF-BUSINESS DATABASES IN DECLARATIVE WORKFLOW

(75) Inventors: Sean K. Gabriel, Bellevue, WA (US);
Alexander Malek, Seattle, WA (US);
Mark E. Phair, Bellevue, WA (US);
Eray Chou, Seattle, WA (US); Jonathan T. Campbell, Kenmore, WA (US);
Bradley C. Stevenson, Seattle, WA (US); Constantin Stanciu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 272 days.

(21) Appl. No.: 12/415,955

(22) Filed: Mar. 31, 2009

(65) Prior Publication Data

US 2010/0250487 A1    Sep. 30, 2010

(51) Int. Cl.
*G06F 7/00* (2006.01)

(52) U.S. Cl.
USPC ............................ 707/608; 707/609; 707/694

(58) Field of Classification Search .................. None
See application file for complete search history.

(56) References Cited

U.S. PATENT DOCUMENTS

| | | | | |
|---|---|---|---|---|
| 6,966,049 B2 * | 11/2005 | Lepejian et al. | ............... | 707/694 |
| 7,257,818 B2 * | 8/2007 | Foerg et al. | ............... | 719/310 |
| 7,287,249 B2 * | 10/2007 | Coyle et al. | ............... | 717/168 |
| 7,370,325 B1 * | 5/2008 | Hull et al. | ............... | 707/609 |
| 7,461,528 B2 * | 12/2008 | Taniguchi et al. | ............... | 70/207 |
| 7,631,291 B2 * | 12/2009 | Shukla et al. | ............... | 717/107 |
| 7,668,807 B2 * | 2/2010 | Dettinger et al. | ............... | 707/999.003 |
| 7,908,249 B1 * | 3/2011 | Gupta et al. | ............... | 707/655 |
| 2004/0225763 A1 * | 11/2004 | Carroll et al. | ............... | 710/36 |
| 2006/0069605 A1 | 3/2006 | Hatoun | | |
| 2006/0074734 A1 * | 4/2006 | Shukla et al. | ............... | 707/694 |
| 2007/0100834 A1 | 5/2007 | Landry | | |
| 2007/0174331 A1 | 7/2007 | Wolf | | |
| 2008/0114770 A1 * | 5/2008 | Chen et al. | ............... | 707/609 |
| 2008/0235261 A1 * | 9/2008 | Malek et al. | ............... | 707/102 |
| 2008/0270369 A1 * | 10/2008 | Myerson et al. | ............... | 707/4 |
| 2008/0270469 A1 * | 10/2008 | Myerson et al. | ............... | 707/608 |

(Continued)

OTHER PUBLICATIONS

Brahim Medjahed, Business-to-business interactions: issues and enabling technologies, 2003, ACM, 27 pages, <URL:http://delivery.acm.org/10.1145/780000/775457/30120059.pdf>.*

(Continued)

*Primary Examiner* — Hung T Vy
*Assistant Examiner* — Hua Lu
(74) *Attorney, Agent, or Firm* — Merchant & Gould

(57) ABSTRACT

A first database and a second database have different schemas. An activity in a workflow accesses a data item in a list by invoking a method in an interface of a list object. The list comprises a collection of data items. Each data item in the list comprises an item key field specifying an item key. No two data items in the data item collection have item key fields specifying a shared item key. In addition, each data item in the list comprises a set of additional fields. Each field in the set of additional fields has a value derived from the first database or each field in the set of additional fields has a value derived from the second database. In this way, the activity can be implemented without knowledge of the different schemas of the first database and the second database.

20 Claims, 8 Drawing Sheets

U.S. PATENT DOCUMENTS

| | | | |
|---|---|---|---|
| 2009/0049422 A1* | 2/2009 | Hage et al. | 717/104 |
| 2009/0119319 A1* | 5/2009 | Li et al. | 707/100 |
| 2009/0165021 A1* | 6/2009 | Pinkston et al. | 719/314 |
| 2009/0183185 A1* | 7/2009 | Srour et al. | 719/328 |
| 2009/0259624 A1* | 10/2009 | DeMaris et al. | 707/608 |
| 2009/0287737 A1* | 11/2009 | Hammerly | 707/608 |

OTHER PUBLICATIONS

Christian Fritz, Automatic Construction of Simple Artifact-based Business Processes, 2009, ACM, 14 pages, <URL:http://delivery.acm.org/10.1145/1520000/1514922/p225-fritz.pdf>.*

"App Arch Guide 2.0 The Book," Chapter 21: SharePoint LOB Applications, http://www.codeplex.com/AppArchGuide/Wiki/View.aspx?title=Chapter%2021%20-%20SharePoint%20LOB%20Applications&referringTitle=Home; 5 pages, Jan. 13, 2009.

"Business Data Catalog Resource Center for SharePoint Server," http://msdn.microsoft.com/en-us/office/bb251754(printer).aspx; 1 page, copyright 2009, printed Jan. 29, 2009.

"Integrating Microsoft® Office SharePoint® Server 2007 and SAP," Jun. 2007, 24 pages.

"SharePoint Conference 2008: Lightweight Business Apps," dated Mar. 13, 2008, http://infowork.ca/tag/workflow/; 4 pages, printed Jan. 29, 2009.

"Workflow in SharePoint," http://www.finalcandidate.com/en/tandp/Pages/SharePointWorkflow.aspx; 6 pages, Mar. 21, 2007.

Microsoft brochure, "Unified Communications and Collaboration for the Banking Industry," 12 pages, copyright 2007.

* cited by examiner

ACCESS TO LINE-OF-BUSINESS DATABASES IN DECLARATIVE WORKFLOW

BACKGROUND

A business process is a structured set of tasks routinely performed by an enterprise to accomplish a concrete business objective. In many instances, the performance of business processes constitutes the routine operation of an enterprise. For example, an enterprise may perform a business process in which employees of the enterprise submit reimbursement requests for travel expenses. In this example, a supervisor reviews each reimbursement request. If, in this example, the supervisor approves a reimbursement request, an accounts payable department of the enterprise writes a check to the employee. If, in this example, the supervisor disapproves a reimbursement request, an email message is sent to the employee notifying the employee that the reimbursement request was denied.

A workflow is a structured set of activities that facilitates performance of a business process. Some or all activities in a workflow correspond to tasks in a business process. Each activity in a workflow comprises a modular set of computer-executable code that, when executed, facilitates a task in the business process. When a computer executes an instance of a workflow, the computer executes the computer-executable code implementing activities in the workflow.

Individual activities in a workflow are modular in the sense that the activities are not dependent on one another to operate correctly. Such modularity enables the same activity to be reused in different workflows. To receive outside information, individual activities have input properties. When a workflow is designed, the input properties of the activities are bound to specific data or data sources. In this way, when the workflow is designed, each activity is able to receive the outside data the activity needs to execute.

Many enterprises use line-of-business databases to store business data. For example, an airline may have a database specifically designed to store passenger bookings. In another example, a police department may have a database specifically designed store criminal records. In some circumstances, it is desirable for activities in a workflow to be able to access data in such line-of-business databases.

SUMMARY

A first database and a second database have different schemas. An activity in a workflow accesses a data item in a list by invoking a method in an interface of a list object. The list comprises a collection of data items. Each data item in the list comprises an item key field specifying an item key. No two data items in the data item collection have item key fields specifying a shared item key. In addition, each data item in the list comprises a set of additional fields. Each field in the set of additional fields has a value derived from the first database or each field in the set of additional fields has a value derived from the second database. In this way, the activity can be implemented without knowledge of the different schemas of the first database and the second database. Furthermore, a user can design declarative workflows without knowledge of the schemas of databases.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
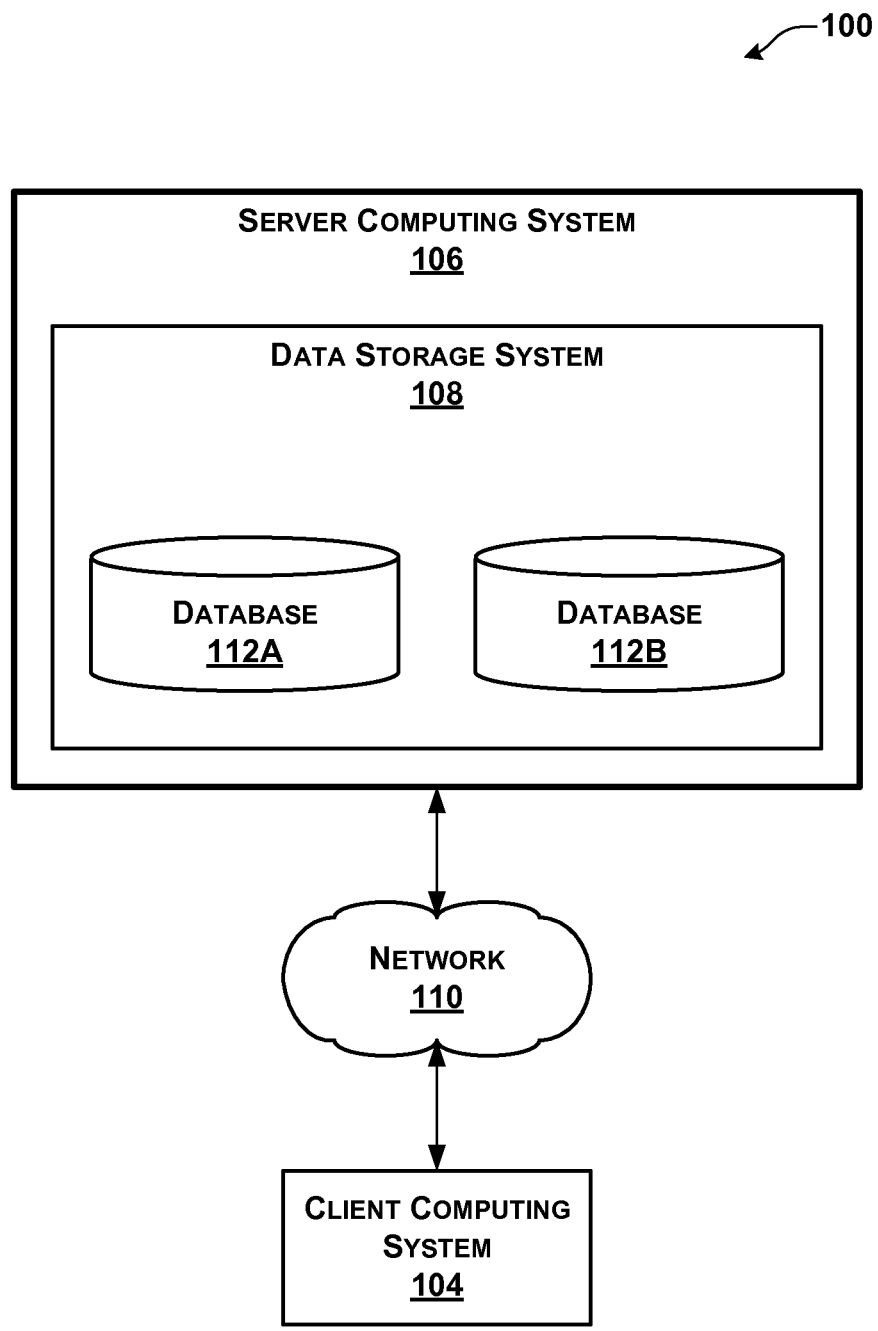
FIG. 1 is a block diagram illustrating an example system.

As briefly described above, the present disclosure describes declarative workflows that access databases having different schemas. This disclosure discusses the attached figures. It will be appreciated that the figures are provided for purposes of explanation only and do not represent a sole way of practicing the technologies of this disclosure. Reference numerals in this disclosure refer to equivalent reference numerals in the figures.

FIG. 1 is a block diagram illustrating an example system 100. It is to be understood that system 100 is merely one example. The techniques of this disclosure may be implemented in many other ways. For instance, other systems implementing the techniques of this disclosure may include more or fewer components, systems, connections, and so on.

As illustrated in the example of FIG. 1, system 100 includes a client computing system 104. Client computing system 104 is an electronic computing system. As used in this disclosure, an electronic computing system is a set of one or more electronic computing devices. This disclosure describes details of an example electronic computing device with reference to FIG. 8. Client computing system 104 may include a wide variety of different types of electronic computing devices. For example, client computing system 104 may include a personal computer, a mobile telephone, a personal digital assistant (PDA), a digital media player, a television set top box, a television, a home appliance, an industrial appliance, a device integrated into a vehicle, a video game console, an Internet kiosk, a netbook, a laptop computer, a handheld video game device, an intermediate network device, a standalone server device, a server blade device, a network storage device, an Automated Teller Machine, a wearable computing device or another type of electronic computing device.

In addition to client computing system 104, system 100 includes a server computing system 106. Server computing system 106 is an electronic computing system. Like client computing system 104, server computing system 106 may include a wide variety of different types of electronic computing devices. For instance, server computing system 106 may include any of the types of electronic computing devices described above.

System 100 also includes a network 110. Network 110 is an electronic communication network. Network 110 facilitates electronic communication between client computing system 104 and server computing system 106. Network 110 may be implemented in a variety of ways. For example, network 110 may be a wide-area network, such as the Internet. In other examples, network 110 may be a local-area network, a metropolitan-area network, or another type of electronic communication networks. Network 110 may include wired and/or wireless data links. A variety of communications protocols may be used in network 110. Such communications protocols include, but are not limited to, Ethernet, Transmission Control Protocol (TCP), Internet Protocol (IP), Hypertext Transfer Protocol (HTTP), Simple Object Access Protocol (SOAP), remote procedure call (RPC) protocols, user datagram protocol (UDP), IPSec, Resource Reservation Protocol (RSVP), Internet Control Message Protocol (ICMP) and/or other types of communications protocols.

Server computing system 106 is configured to execute workflow instances. As used in this disclosure, a workflow instance is an instance of a workflow. A workflow is structured set of computerized activities that facilitates performance of a business process. A business process is a structured set of tasks routinely performed by an enterprise to accomplish a concrete business objective. For example, a workflow may be a structured set of tasks that facilitates performance of a business process to approve travel expenses. In this example, the concrete business objective is predictable approval or disapproval of travel expenses to manage costs and ensure accountability. Furthermore, in this example, the business process may include tasks such as receiving an expense report, providing the expense report to a reviewer for review, receiving approval of the expense report, cutting a check, and so on. As used in this disclosure, an enterprise is a business organization, a governmental organization, a non-government organization, an individual, a non-profit organization, or another type of natural or legal entity.

As mentioned above, a workflow comprises a structured set of activities. Each activity in a workflow comprises a modular set of computer-executable instructions that, when executed by a computing system facilitates performance of a task in a business process. For example, an activity in a workflow may comprise a modular set of computer-executable instructions that, when executed by a computing system, cause the computing system to provide an expense report to a reviewer for review. The sets of computer-executable instructions in activities are modular in the sense that the sets are not dependent on one another to operate correctly. Such modularity enables the same activity to be reused in different workflows.

Each activity in a workflow has one or more input properties. An activity receives external information through its input properties. In a first example implementation, activities are implemented as software objects. In this first example, the input properties of activities are parameters of the constructor methods of the activities. In other example implementations where activities are implemented as software objects, input properties may be parameters passed to public setter methods of the activities or objects assigned to public properties of the activities.

A wide variety of external information can be passed to an activity via the activity's input properties. For example, an activity in a travel expense approval workflow may send an e-mail to a reviewer. In this second example, the e-mail address of the reviewer can be passed to the activity via an input property of the activity.

As illustrated in the example of FIG. 1, server computing system 106 includes a data storage system 108. As used in this disclosure, a data storage system is a collection of one or more computer-readable data storage media. For example, a data storage system may comprise a plurality of hard disk drives. In another example, a data storage system may comprise a CD-ROM disc and a random-access memory unit.

Furthermore, in the example of FIG. 1, data storage system 108 stores a database 112A and a database 112B (collectively, "databases 112"). Both database 112A and database 112B are structured sets of data. However, database 112A and database 112B have different structures. For example, database 112A and database 112B may be implemented using different database models. Example database models include relational models, dimensional models (e.g., online analytical processing (OLAP)), associative models, flat file models, network models, object-oriented models, and other database models. In another example, database 112A and database 112B may be implemented using the same database model, but may have different database schemas. As used in this disclosure, a database schema is a formal description of the structure of the database. For instance, a database schema of a database may define the tables in the database, the fields in each of the tables, and the relationships between the fields and tables. In such implementations, database 112A and database 112B may be implemented using the relational database model, but have different tables, fields, and/or relationships between fields and tables.

Database 112A and database 112B may store a variety of different types of data. For example, database 112A may store resources associated with a website of an enterprise and database 112B may store inventory data for the enterprise. One or more of databases 112 may be line-of-business databases. A line-of-business database is a database tailored to a particular line of business. For example, an airline may use a line-of-business database tailored to store information about passenger bookings and flights.

Data in databases 112 may be conceptually organized into lists. As used in this disclosure, a list is a collection of data items. Each data item in a list has an item key field specifying an item key. An item key is an object storing data that can be used to identify a data item. Item keys may be implemented in a variety of ways. For example, an item key may be implemented as an integer, a character string, a floating point number, a set of values, or another type of object storing data that can be used to identify a data item. No two data items in a list have a shared item key. For example, no two data items in a list can have an item key "1234."

In addition, each data item in a list includes a set of one or more additional fields. Each field in the set of additional fields has a value derived from a database. For example, each field in the set of additional fields has a value derived from database 112A. In another example, each field in the set of additional fields has a value derived from database 112B. As used in this disclosure, a value derived from a database is either explicitly stored in the database or calculated from data stored in the database. Because each data item in a list has the same set of fields, a list can be visualized as a table in which there is a column for each field and a row for each data item.

Lists may be actual lists or external lists. Each data item in an actual list includes a field explicitly indicating the actual list. For example, database 112A may include a table for all data items. In this example, each data item in the table has a field containing a GUID identifying a list that includes the data item. Data items in a external list do not include fields explicitly indicating the external list. For example, database 112B may include a table for all data items, but data items in the table do not include fields identifying lists that include the data items. In a second example, database 112B may not include a single table containing all fields of data items in a external list. Rather, the external list is drawn from database 112B by querying database 112B.

As explained below with reference to FIGS. 4 and 5, server computing system 106 initializes one or more list objects. Each list object is a software object implementing an interface that includes access methods that enable access data items in a list. A list object may enable access to an actual list or a external list. Each list object implements a common interface. The interface has the same members (i.e., methods and/or properties) regardless of whether values of fields of data items in the list are derived from database 112A or database 112B. For example, list objects may include the same methods for adding data items to a list, deleting data items in a list, modifying values of fields of data items in a list, and looking up data items in a list. Because databases 112 are implemented differently, list objects enabling access to lists drawn from databases 112 are implemented differently. For example, a list object enabling access to a list of data items in database 112A may contain different code than a list object enabling access to a list of data items in database 112B.

Activities in a workflow use the list objects to access data in database 112A and database 112B. For example, database 112A may store flight data and database 112B may store personnel data, including e-mail addresses of employees. In this example, an activity in a workflow may need to generate and send e-mail messages to members of a flight crew when a flight has been canceled. To access data in a list, an activity invokes access methods of the list object. For example, an activity may invoke the delete method of a list object to delete an item from a list. Because each list object implements a common interface, activities do not to invoke different access methods depending on how databases 112 are implemented.

When an activity invokes an access method of a list object, the activity may provide an item key as a parameter to the access method. For example, when an activity invokes an access method to delete a data item in a list, the activity may provide an item key to the method. In this example, the item key is associated with the data item.

As described below with reference to FIG. 7, a user of client computing system 104 interacts with client computing system 104 to design a workflow using a declarative workflow design application. A declarative workflow design application is an application that enables a user to design a workflow using natural language sentences that express business process tasks performed by activities. For example, a declarative workflow design application may display the following sentence: "Send an email message to _____." In this example, the sentence expresses the business process task of sending an e-mail message. A specific activity implements this task, but the user does not need to know how anything about how the specific activity is added to the workflow or how the specific activity operates. In other words, implementation details of the activity are hidden from the user.

Depending on the activities associated with the natural language sentences presented by the declarative workflow design application, the natural language sentences may include one or more input features. The input features in a sentence associated with an activity enable the user to specify data to be bound to input properties of the activity. Server computing system 106 uses data bound to an input property of an activity when server computing system 106 executes the activity. In the example of the previous paragraph, the sentence includes an input feature represented by the underscored blank. The user, in this example, can type in an e-mail address in the underscored blank. For instance, the user could insert the e-mail address "w.tanner@contoso.com" in the input feature of the sentence. In this example, server computing system 106 uses the data (i.e., w.tanner@contoso.com) bound to an input property of the activity to send an e-mail message to w.tanner@contoso.com.

In some circumstances, the user may not wish to explicitly specify data to be bound to an input property of an activity. Rather, the user may wish the activity to look up the data in a list. For example, the user may wish to send the e-mail to persons at the airline who have the job title "Pilot." In this example, the people who are pilots can change as pilots are hired by the airline or leave the airline. It would be impractical to re-write a workflow containing an activity that sends e-mails to all pilots whenever a pilot arrives at the airline or leaves the airline. For this reason, the declarative workflow design application is able to present a lookup dialog that enables the user to design a query that looks up the e-mail addresses of all pilots when the workflow is executed.

In some instances, the same data item in a list is used repeatedly. In the previous example, the data items in a list may contain the names, e-mail addresses, and job titles of employees at the airline. In this example, the e-mail sending activity may need to look up the e-mail addresses of a pilot and the name of the pilot. In such instances, it may be more efficient to use an item key of the data item associated with the pilot rather than searching the entire list twice. A lookup dialog interface enables the user specify that a field of a data item identified by a particular item key is to be bound to an input property of an activity. For example, the lookup dialog interface may enable the user to specify that the e-mail address field of a data item associated with item key "142" is to be bound to an input property of an activity.

When the user of client computing system 104 designs a workflow, client computing system 104 stores a workflow file at data storage system 108 at server computing system 106. As described below, the workflow file may contain activity elements specifying each activity in the workflow and specifying data to be bound to input properties of activities in the workflow. After the workflow file is stored at data storage system 108, server computing system 106 is able to generate an instance of the workflow and execute the instance of the workflow.

In the example of FIG. 1, the user of client computing system 104 also interacts with client computing system 104 to cause client computing system 104 to send resource requests to server computing system 106. For example, client computing system 104 may send a HTTP request to server computing system 106. As described below with reference to FIGS. 4 and 6, server computing system 106 may instantiate and execute workflows in response to resource requests from client computing system 104.

It should be appreciated that FIG. 1 is provided for explanatory purposes only. In other examples, system 100 may include many other computing systems. For example, system 100 could include a large number of client computing systems. Moreover, the functionality described above with regard to client computing system 104 may be distributed among several client computing systems. For instance, a user of a first client computing system may design a workflow and a user of a second client computing system may send resource requests to server computing system 106. In another example, functionality described above as occurring at client computing system 104 may occur at server computing system 106. For instance, a user of server computing system 106 may design a workflow or a resource request may originate at server computing system 106. Consequently, the disclosure may refer to a design computing system at which the user designs workflows.

Figure 2:
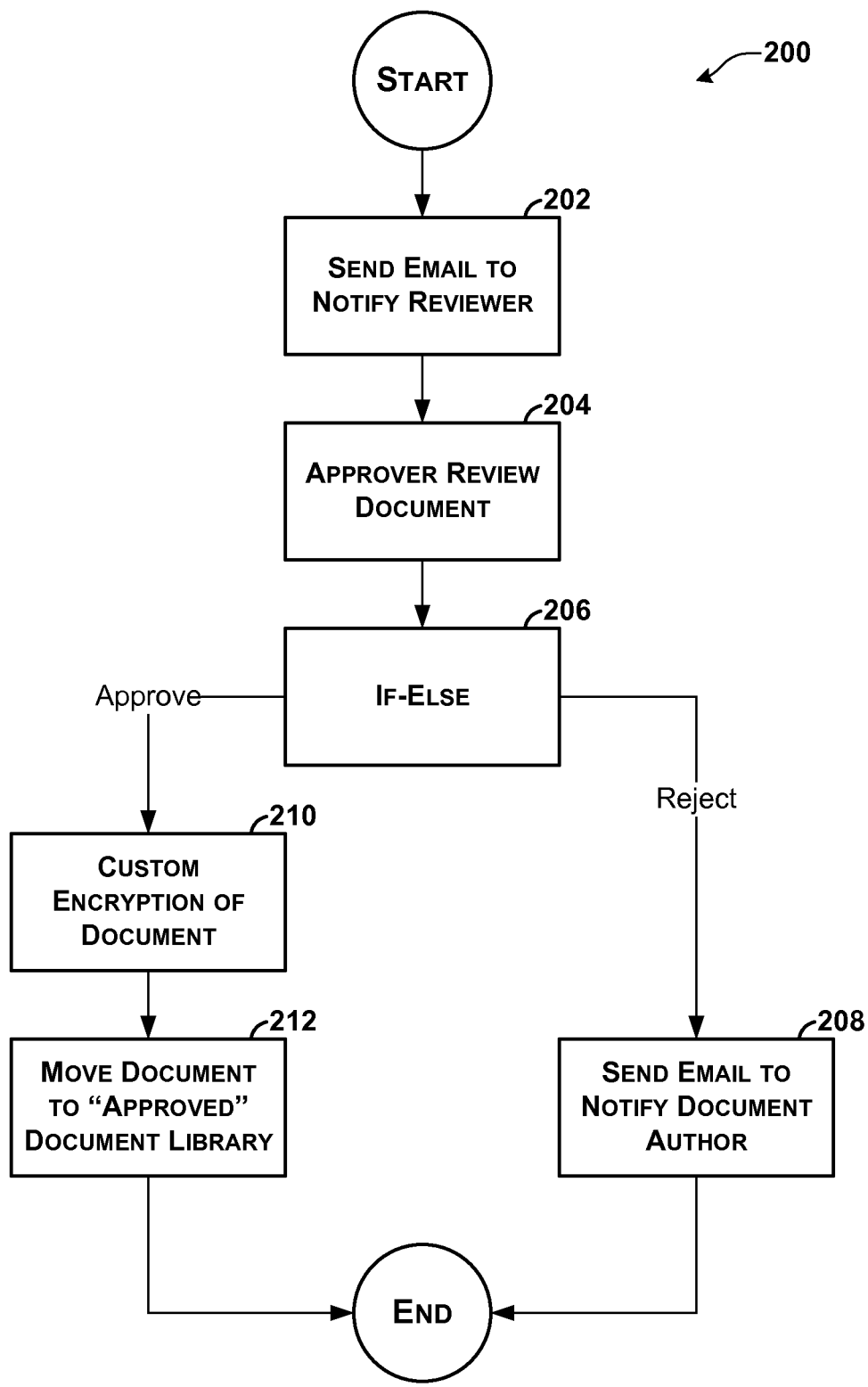
FIG. 2 is a block diagram illustrating an example workflow.

FIG. 2 is a block diagram illustrating an example workflow 200. It should be appreciated that workflow 200 is provided for purposes of explanation only. Workflow 200 is not intended to be interpreted as a sole workflow that can be used in system 100.

In the example of FIG. 2, workflow 200 implements a business process for approving a document. At activity 202, an e-mail is sent to a reviewer notifying the reviewer that an author has added a document to an "unapproved" document library. Next, at activity 204, an approver reviews the document. At activity 206, it is automatically determined whether the approver approved the document or rejected the document. If the approver rejected the document, an e-mail is sent to the author at activity 208, the e-mail notifying the author that the approver rejected document. If the approver approved the document, a custom encryption operation is performed on the document at activity 210. After the custom encryption operation is performed on the document, the document is moved to an approved document library at activity 212. After activity 208 or activity 212, workflow 200 ends.

Figure 3:
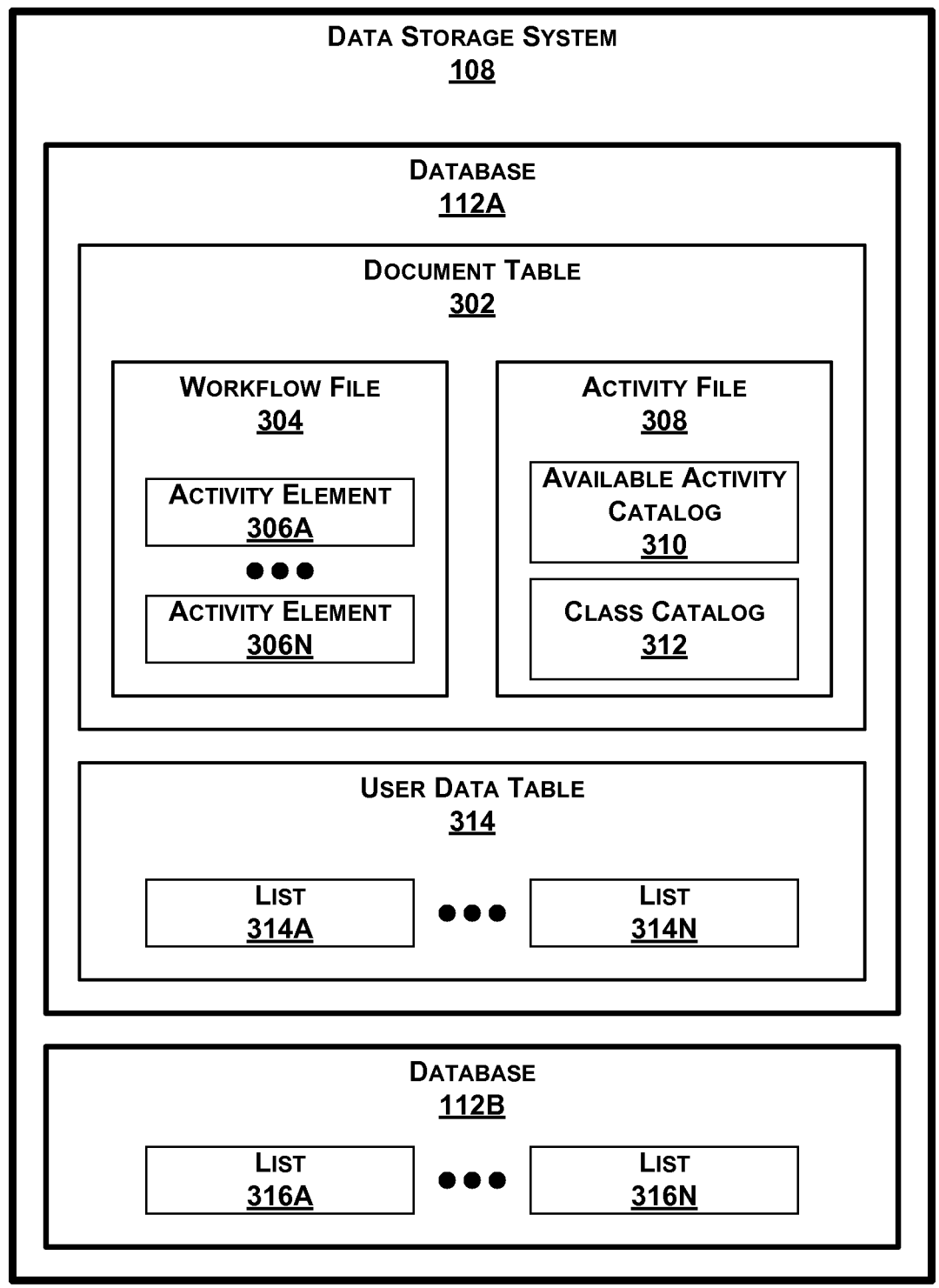
FIG. 3 is a block diagram illustrating an example structure of a data storage system.

FIG. 3 is a block diagram illustrating an example structure of data storage system 108. It should be appreciated that logical components in FIG. 3 are provided for explanatory purposes only and not intended to represent a sole way of logically organizing server computing system 106. Rather, many other logical organizations of server computing system 106 are possible.

As illustrated in the example of FIG. 3, database 112 comprises a document table 302. Document table 302 is a database table that stores documents and associated metadata. For example, document table 302 may contain documents associated with a website. In this example, the documents may include digital images, word processor documents, hypertext markup language (HTML) documents, extensible markup language (XML) documents, and other types of documents.

In the example of FIG. 3, document table 302 includes a workflow file 304. Workflow file 304 includes a plurality of activity elements 306A-306N (collectively, "activity elements 306"). In one example implementation, workflow file 304 is an XML file. Furthermore, in this example implementation, workflow file 304 may be an Extensible Object Markup Language (XOML) file or an Extensible Application Markup Language (XAML) file. XAML and XOML are declarative XML-based languages defined and published by Microsoft Corporation. Each one of activity elements 316 is an XML element in this XML file. Activity elements 316 are arranged within the XML file a hierarchy. Each of activity elements 316 specifies an activity to include in a workflow. The position of an activity element within the hierarchy indicates the position within the workflow of the activity specified by the activity element. For example, workflow file 304 may appear, in a simplified form, as follows:

```
<SequentialWorkflowActivity>
    <ReceiveDocumentActivity/>
    <SendEmailActivity to="t.ochmonek" from="admin@contoso.com"/>
    <ReceiveReviewActivity/>
</SequentialWorkflowActivity>
```

In this example, the <SequentialWorkflowActivity> element is an activity that sequentially invokes activities specified by child activity elements of the <SequentialWorkflowActivity> element. Specifically, in this example, the activity specified by the <SequentialWorkflowActivity> element sequentially invokes an activity specified by the <ReceiveDocumentActivity> element, an activity specified by the <SendEmailActivity> element, and an activity specified by the <ReceiveReviewActivity> element. Furthermore, in this example, the <SendEmailActivity> element has two attributes: "to" and "from." The e-mail address "t.ochmonek" is assigned to the "to" attribute and the e-mail address "admin@contoso.com" is assigned to the "from" attribute.

Document table 302 also includes an activity file 308. Activity file 308 includes an available activity catalog 310. Available activity catalog 310 specifies activities that are available to be included in a workflow. Furthermore, activity file 308 includes a class catalog 312. Class catalog 312 includes a set of class stubs. Each class stub in class catalog 312 describes an interface of an object class used by one or more of the activities specified by available activity catalog 310. The class stubs in class catalog 312 do not necessarily include code implementing the interfaces of the object classes. As described below with reference to the example of FIG. 7, class catalog 312 includes a class stub describing the interface of the item key object.

Furthermore, database 112A comprises a user data table 314. User data table 314 is a database table storing user-specified data items. In the example of FIG. 3, the data items in user data table 314 are logically subdivided into lists 316A-316N (collectively, "lists 316"). In one example implementation, each data item in user data table 314 has a "list" field that specifies a list identifier. In this example implementation, data items specifying a list identifier of a list are members of that list.

In the example of FIG. 3, data storage system 108 also includes database 112B. Database 112B includes lists 316A-316N (collectively, "lists 316"). Lists 316 may store a wide variety of different types of data items. In some example implementations, lists 316 do not represent actual database tables in database 112B.

Figure 4:
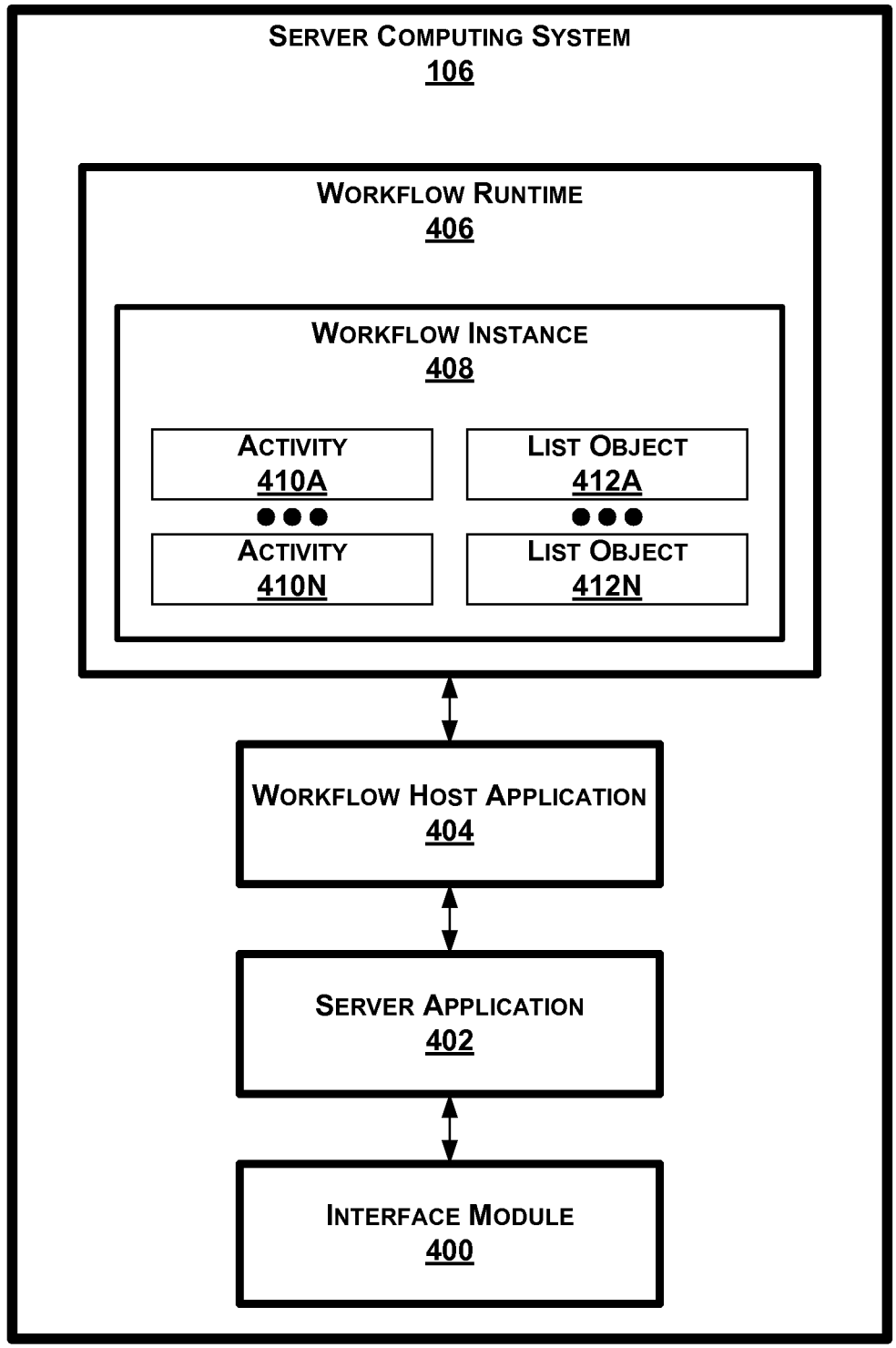
FIG. 4 is a block diagram illustrating example logical components of a server computing system.

FIG. 4 is a block diagram illustrating example logical components of server computing system 106. It should be appreciated that logical components in FIG. 4 are provided for explanatory purposes only and not intended to represent a sole way of logically organizing server computing system 106. Rather, many other logical organizations of server computing system 106 are possible.

As illustrated in the example of FIG. 4, server computing system 106 comprises an interface module 400, a server application 402, a workflow host application 404, a workflow runtime 406, a workflow instance 408, a plurality of activities 410A-410N (collectively, "activities 410"), and a plurality of list objects 412A-412N (collectively, "list objects 412").

Interface module 400 enables server computing system 106 to communicate on network 110 (FIG. 1). For instance, interface module 400 enables server computing system 106 to send and receive network protocol messages from client computing system 104 (FIG. 1). When interface module 400 receives a resource request, interface module 400 provides the resource request to server application 402.

Server application 402 is a network server application. For example, server application 402 may be an instance of the Internet Information Services (IIS) server created by Microsoft Corporation. When server application 402 receives a resource request, server application 402 identifies an application to help process the resource request. Upon identifying the application to help process the resource request, server application 402 sends a request to the identified application. In the example of FIG. 4, server application 402 sends the request to workflow host application 404.

Workflow host application 404 helps process resource requests received by server application 402. For example, workflow host application 404 may be an ASP.NET web application. Workflow host application 404 may help process resource requests in a variety of ways. In the example of FIG. 4, workflow host application 404 helps process resource requests using workflows.

To use a workflow to help process a resource request, workflow host application 404 instantiates workflow instance 408 in workflow runtime 406. Workflow runtime 406 is an operating environment that manages workflow instances. When workflow host application 404 instantiates workflow instance 408, workflow host application 404 may identify workflow file 304 to workflow runtime 406. In response, workflow runtime 406 retrieves workflow file 304 from data storage system 108. After retrieving workflow file 304, workflow runtime 406 uses activity elements 316 in workflow file 304 to instantiate activities indicated by activity elements 316. In the example of FIG. 4 activities 410 are the instantiated activities indicated by activity elements 316.

When workflow runtime 406 instantiates activities 410, workflow runtime 406 also instantiates list objects 412. List objects 412 enable activities 410 to access one or more of lists 314 in database 112A and/or list 316 in database 112B.

Once workflow instance 408 is fully instantiated, workflow host application 404 is able to instruct workflow runtime 406 to initiate execution of workflow instance 408. As described in greater detail with reference to FIG. 5, when server computing system 106 executes one or more activities of workflow instance 408, server computing system 106 generates data used by workflow host application 404 to help process the resource request received by server application 402. Eventually, workflow host application 404 returns data to server application 402. Server application 402 uses the returned data in a response to the resource request. Interface module 400 sends the response back to the sender of the resource request.

In this disclosure, interface module 400, server application 402, workflow host application 404, workflow runtime 406, workflow instance 408, activities 410, and list objects 412 are referred to as functional modules of server computing system 106. The functional modules of server computing system 106 may be implemented in a wide variety of ways. In a first example, one or more of the functional modules of server computing system 106 may be implemented as sets of instructions stored at a data storage system. In this first example, a processing unit within server computing system 106 may execute the sets of instructions, thereby causing server computing system 106 to perform the behaviors associated with one or more of the functional modules of server computing system 106. As used in this disclosure, a processing unit is a set of one or more physical electronic integrated circuits that are capable of executing instructions. In a second example, one or more of the functional modules of server computing system 106 are implemented as one or more application-specific integrated circuits (ASICs). The ASICs cause server computing system 106 to perform the behaviors associated with one or more of the functional modules of server computing system 106. In this second example, the ASICs may be specifically designed to perform the behaviors associated with one or more of the functional modules of server computing system 106.

Figure 5:
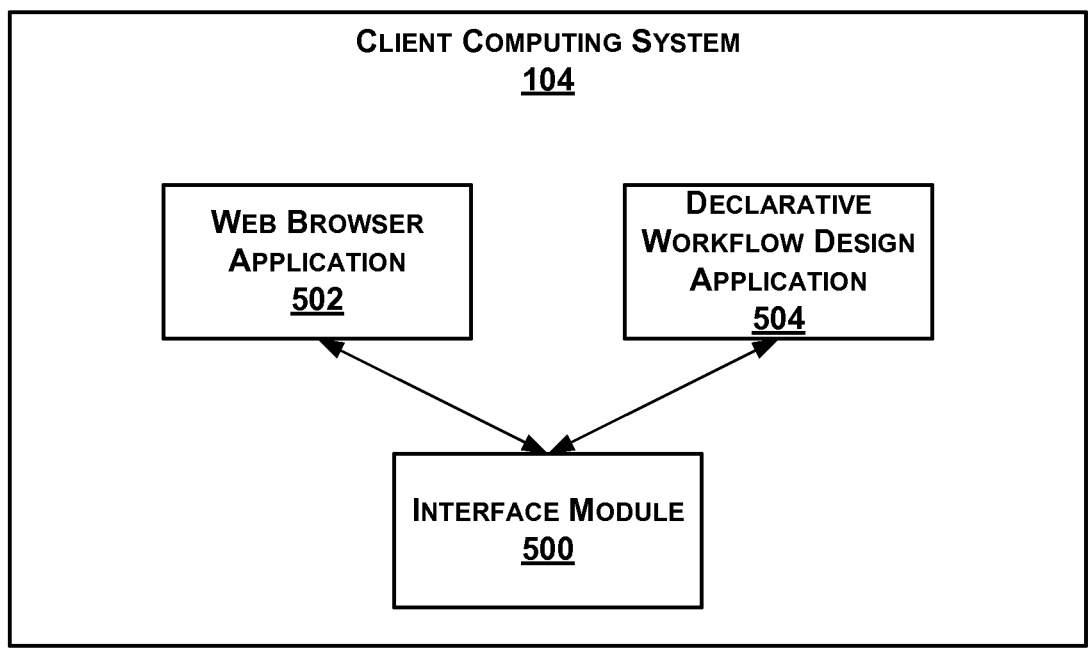
FIG. 5 is a block diagram illustrating example logical components of a client computing system.

FIG. 5 is a block diagram illustrating example logical components of client computing system 104. It should be appreciated that logical components in FIG. 5 are provided for explanatory purposes only and not intended to represent a sole way of logically organizing client computing system 104. Rather, many other logical organizations of client computing system 104 are possible.

As illustrated in the example of FIG. 5, client computing system 104 comprises an interface module 500, a web browser application 502, and a declarative workflow design application 504. Interface module 500 enables client computing system 104 to communicate on network 110 (FIG. 1). For example, interface module 500 enables client computing system 104 to send and receive communication protocol messages on network 110. Web browser application 502 enables a user to interact with client computing system 104 to cause client computing system 104 to retrieve resources available on network 110 and to display certain types of resources. Declarative workflow design application 504 is an instance of a declarative workflow design application of the type described above with regard to FIG. 1 and below with regard to FIG. 7.

In this disclosure, interface module 500, web browser application 502 and declarative workflow design application 504 are referred to as functional modules of client computing system 104. The functional modules of client computing system 104 may be implemented in a wide variety of ways. In a first example, one or more of the functional modules of client computing system 104 may be implemented as sets of instructions stored at a data storage system. In this first example, a processing unit within client computing system 104 may execute the sets of instructions, thereby causing client computing system 104 to perform the behaviors associated with one or more of the functional modules of client computing system 104. In a second example, one or more of the functional modules of client computing system 104 are implemented as one or more ASICs. The ASICs cause client computing system 104 to perform the behaviors associated with one or more of the functional modules of client computing system 104. In this second example, the ASICs may be specifically designed to perform the behaviors associated with one or more of the functional modules of client computing system 104.

Figure 6:
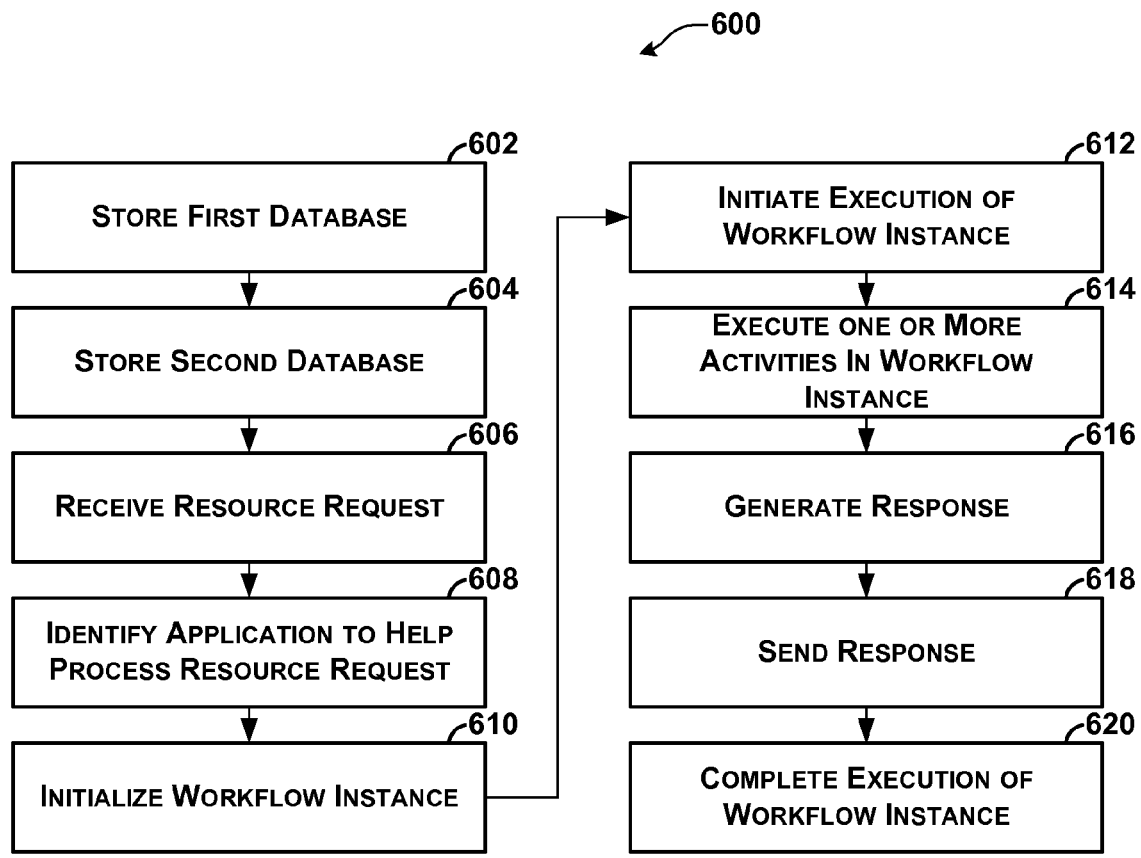
FIG. 6 is a flowchart illustrating an example operation of the server computing system.

FIG. 6 is a flowchart illustrating an example operation of server computing system 106. It should be appreciated that operation 600 is merely an example operation of server computing system 106. Many other operations of server computing system 106 are possible. For instance, other operations of server computing system 106 may include more or fewer steps. In other instances, operations of server computing system 106 may include the steps of operation 600 in different orders.

As illustrated in the example of FIG. 6, operation 600 begins when database 112A is stored at data storage system 108 (602). Next, database 112B is stored at data storage system 108 (604). Server computing system 106 may store database 112A and database 112B in response to configuration input from an administrator of server computing system 106.

After database 112A and database 112B are stored at data storage system 108, server application 402 receives a resource request (606). In one example, server application 402 may receive the resource request from interface module 400 and interface module 400 may have received the resource request from client computing system 104 via network 110. The resource request may request a wide variety of resources. For example, the resource request may be a request for a web page, a request to synchronize e-mail mail boxes, a RPC request for execution of a specific procedure, a request for a media stream, or a request for another type of resource.

In response to receiving the resource request, server application 402 identifies an application to help process the resource request (608). For example, a plurality of web applications may operate at server computing system 106, each associated with different domain names. In this example, server application 402 may use a domain name specified by the resource request to identify one of the web applications. In other examples, server application 402 may use a variety of other techniques to identify an application to help process the resource request. For instance, server application 402 may use a lookup table or a configuration file to identify an application to help process the resource request. Applications may help server application 402 process resource requests in a variety of ways. For example, applications may help server application 402 process resource requests by generating content, retrieving data, storing data, executing scripts, and/or performing other activities. In the example of FIG. 6, it is assumed that server application 402 identifies workflow host application 404 as the application to help process the resource request.

After being identified as an application to help process the resource request, workflow host application 404 initializes workflow instance 408 (610). In one example implementation, workflow host application 404 may initialize workflow instance 408 by invoking a method of workflow runtime 406. In this example implementation, workflow host application 404 may provide a reference to a workflow file as parameters when workflow host application 404 invokes the method of workflow runtime 406. In this way, workflow host application 404 identifies to workflow runtime 406 which workflow file to use to generate workflow instance 408. For instance, workflow host application 404 may provide a reference to workflow file 304 as a parameter to the method of workflow runtime 406.

During the initialization of workflow instance 408, workflow runtime 406 interprets the specified workflow file and instantiates each activity specified by the activity elements of the specified workflow file. For example, if workflow file 304 is the specified workflow file, workflow runtime 406 instantiates one of activities 410 for each of activity elements 316 in workflow file 304. To instantiate an activity, workflow runtime 406 may invoke a constructor method of the activity.

Furthermore, during the initialization of workflow instance 408, workflow runtime 406 instantiates list objects required by activities specified by the workflow file. For example, if workflow file 304 is the specified workflow file, workflow runtime 406 instantiates list objects required by activities 410. In this example, workflow runtime 406 may instantiate activities 410 by executing constructor methods of activity classes. The constructor methods of the activity classes may invoke constructor methods of list objects classes. Consequently, when workflow runtime 406 executes the constructor methods of activities 410, workflow runtime 406 executes the constructor methods of list objects 412, thereby instantiating list objects 412.

After workflow host application 404 initializes workflow instance 408, workflow host application 404 initiates execution of workflow instance 408 (612). In one example implementation, workflow host application 404 may initiate execution of workflow instance 408 by invoking a start method of workflow instance 408. It should be noted that workflow host application 404 does not necessarily initialize and initiate execution of a new workflow instance in response to all resource requests. In some instances, workflow host application 404 may provide additional information to existing workflow instances in response to a resource request.

In response to workflow instance 408 initiating execution of workflow instance 408, server computing system 106 executes one or more activities 410 in workflow instance 408 (614). During execution of activities in workflow instance 408, server computing system 106 uses data bound to input properties of the activities to execute the activities. For example, if workflow runtime 406 binds the e-mail address "g.shumway@contoso.com" to the reviewer input property of a SendEmailActivity activity, server computing system 106 uses the e-mail address "g.shumway@contoso.com" during execution of the SendEmailActivity activity.

Furthermore, during execution of the one or more activities in workflow instance 408, server computing system 106 may access a first data item in a first list. The first list is based on data in database 112A. Server computing system 106 accesses the first data item by invoking a method of one of list objects 412 that provides access to the first list. When server computing system 106 accesses the data item in database 112A, server computing system 106 provides a first key item to the access method as a parameter. The first key item uniquely identifies the data item within the list.

An activity in workflow instance 408 may cause server computing system 106 to access data items in a list in a variety of ways. For instance, an activity in workflow instance 408 may cause server computing system 106 to look up, add, delete, or edit data items in a list.

In one example implementation, the interface implemented by list objects 412 includes a query method that takes a query object as a parameter. In this example, the query object may be an object containing a Collaborative Application Markup Language (CAML) query string. The query method returns a data item collection containing data items responsive to the query contained in the query object. In this example, activity 410A may access data items in a list by invoking the query method of one of list objects 412.

In one example implementation, a list object representing a list includes a data item collection object representing a collection of data items in the list. In this example implementation, an activity in workflow instance 408 may add a data item to a list by retrieving the data item collection object from the list object. In this example implementation, the activity may then invoke an add method of the data item collection object to add a data item to the collection of data items in the list. The add method returns a reference to the new data item. The activity may then set values of fields in the new data item. Depending on the schema of the database from with the list is drawn, the add method may automatically generate and store a key item for the new data item.

In one example implementation, an activity in workflow instance 408 may delete a data item in a list by first invoking the "get items" method of a list object representing the list, providing a query that returns the item key of the data item. The activity may then retrieve a data item collection from the list object. In this example implementation, the activity may then invoke a delete method of the data item collection object to delete the data item in the collection of data items. When the activity invokes the delete method, the activity provides the item key of the data item to the delete method.

In one example implementation, an activity in workflow instance 408 may edit a data item in the list by first invoking the "get items" method of the list object, providing a query that returns the item key of the data item. The "get items" method returns a data item collection object representing a collection of data items in the list that are responsive to the query. The activity then invokes a get item method of the returned data item collection object, providing an item key of the data item. The get item method returns a reference to a data item. The activity then uses the reference to the data item to edit the values of one or more fields of the data item.

After server computing system 106 executes one or more activities 410 in workflow instance 408, server application 402 generates a response to the resource request (616). The response may include data generated during execution of the one or more activities of workflow instance 408. For instance, the response may include data retrieved from a database by one of the activities in the workflow instance 408. In other circumstances, the response does not include any data generated during execution of the one or more activities of workflow instance 408. It should be appreciated that workflow instance 408 may not run to completion before server application 402 generates the response. Rather, workflow instance 408 may continue operating asynchronously from server application 402. For instance, workflow instance 408 may continue operating when workflow instance 408 is an instance of a long-running workflow whose activities occur over the course of several days.

After server application 402 generates the response, interface module 400 sends the response to a sender of the resource request (618). For example, if client computing system 104 sent the resource request, interface module 400 sends the response to client computing system 104.

At some time after server computing system 106 executes one or more activities in workflow instance 408, server computing system 106 completes execution of workflow instance 408 (620). For example, server computing system 106 may complete execution of workflow instance 408 immediately after executing the one or more activities. In a second example, workflow instance 408 may persist after server application 402 generates and sends the response. In this second example, workflow instance 408 may persist because one of activities 410 is waiting for input from a user. For instance, an activity may be waiting for a user to fill out a form or to provide approval for an expense. Completion of workflow instance 408 completes a cycle of the business process facilitated by the workflow.

Figure 7:
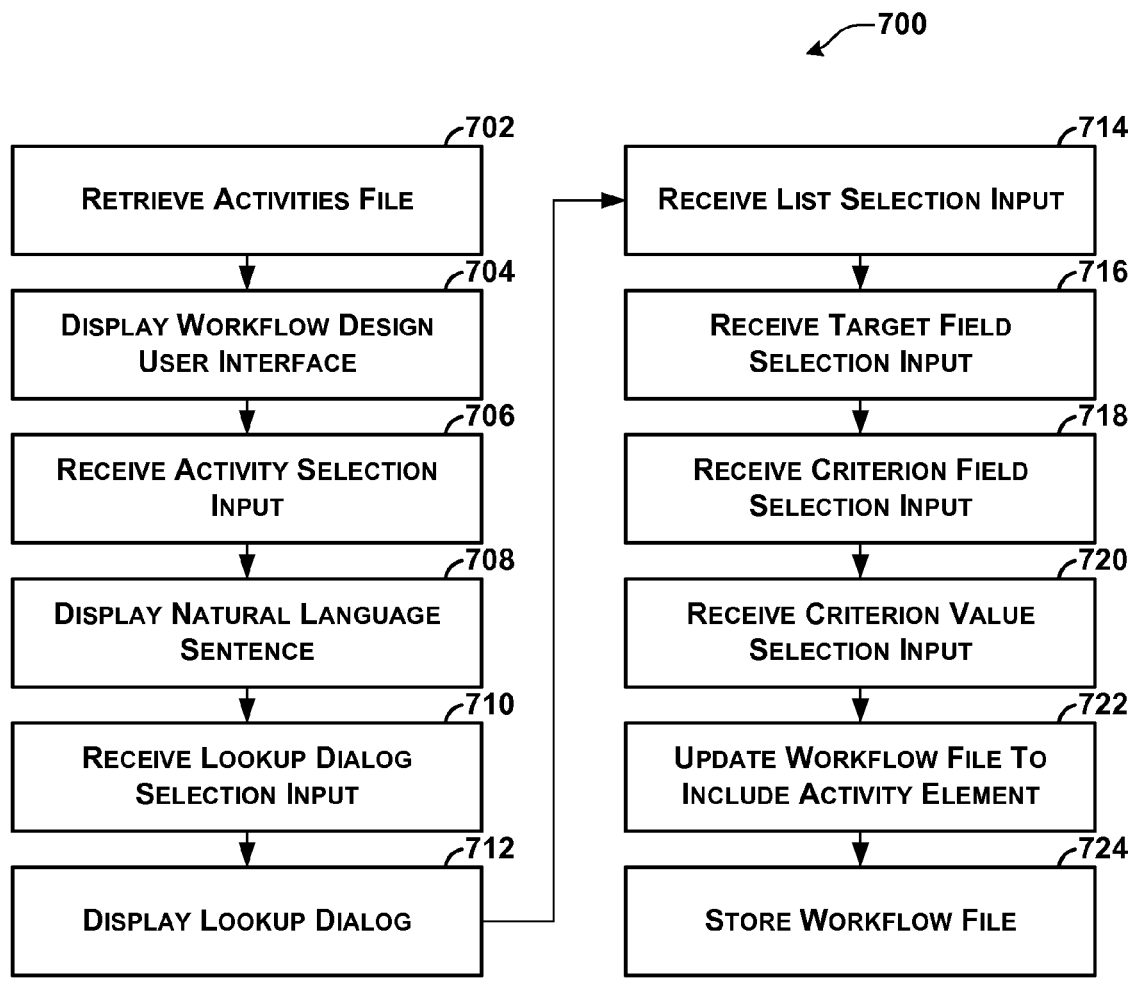
FIG. 7 is a flowchart illustrating an example operation of the client computing system to design a workflow using a declarative workflow design application.

FIG. 7 is a flowchart illustrating an example operation of client computing system 104 to design a workflow using declarative workflow design application 504. It should be appreciated that operation 700 is merely an example operation of client computing system 104. Many other operations of client computing system 104 are possible. For instance, other operations of client computing system 104 may include more or fewer steps. In other instances, operations of client computing system 104 may include the steps of operation 700 in different orders.

Initially, declarative workflow design application ("DWDA") 404 (FIG. 5) in client computing system 104 retrieves activities file 308 (702). DWDA 404 may retrieve activities file 308 in a variety of ways. For example, DWDA 404 may send a request for activities file 308 via network 110 to server computing system 106. In some implementations, DWDA 404 may store a cached copy of activities file 308 at client computing system 104. By retrieving activities file 308, DWDA 404 is able to determine a set of activities available to be executed at server computing system 106. In addition, by retrieving activities file 308, DWDA 404 is able to determine a set of classes that can be bound to input properties of the available activities. For example, DWDA 404 may be able to determine that item key objects can be bound to input properties of the available activities.

After retrieving activities file 308, DWDA 404 displays a workflow design user interface (704). The workflow design user interface is a graphical user interface (GUI) that enables the user of client computing system 104 to design a workflow. The workflow design user interface contains a catalog of available activities. The catalog of available activities includes names of activities available to be included in a workflow. For example, the workflow design user interface may include the following available activity names: "Send Email," "Request Review," "Encrypt File," "Transfer File to Document Archive," and so on.

After displaying the workflow design user interface, DWDA 504 receives activity selection input (706). The activity selection input indicates a selected available activity name from among the available activity names contained in the workflow design user interface. The selected available activity name is the name of a selected available activity. For example, the activity selection input may indicate that the user has selected "Send Email" from among the available activity names contained in the workflow design user interface.

In response to receiving the activity selection input, DWDA 504 displays a natural language sentence in the workflow design user interface (708). The natural language sentence expresses a business process task facilitated by the selected activity. For example, DWDA 504 may display the following natural language sentence in response to the user selecting "Send Email" from among the available activity names: "Send an e-mail message from _____ to _____." In circumstances where the selected activity has an input property to be specified by the user, the natural language sentence includes an input feature enabling the user to select particular data to be bound to the input property or to select a variable name. In the previous example, the selected "Send Email" activity has two input properties to be specified by the user. Consequently, in this example, the natural language sentence includes two input features, indicated by the underscored blanks. In other examples, the input features may be text boxes, drop boxes, radio buttons, check boxes, dials, menus, command icons, or other types of user input controls.

To bind data in a list to an input property of the activity, the user provides lookup dialog selection input to DWDA 504. In one example implementation, the user provides lookup dialog selection input to DWDA 504 by selecting a small icon associated with the input property. In this example implementation, the icon may be disposed in the sentence next to the input feature associated with the input property.

When the user provides the lookup dialog selection input to DWDA 504, DWDA 504 receives lookup dialog selection input (710). The lookup dialog selection input indicates that the user wants the input property to be bound to data in a list. In response to receiving the lookup dialog selection input, DWDA 504 presents a lookup dialog user interface that enables the user to build a query (712). The lookup dialog user interface includes a list selection feature. The list selection feature enables the user to select a list from a catalog of available lists. The available lists may include lists based on data in database 112A and data in database 112B. To simply the process of designing a declarative workflow, DWDA 504, in one example implementation, presents the available lists such that the user cannot distinguish which lists in the catalog of available lists are based on database 112A and which lists in the catalog are based on database 112B. Furthermore, the available lists may include external lists and actual lists.

In the example of FIG. 7, the lookup dialog user interface also includes a target field selection feature, a criterion field selection feature, and a criterion value selection feature. The target field selection feature enables the user to select a target field. The target field is a field of the selected list. The target field contains that data to be bound to the input property of the activity. The criterion field selection feature enables the user to select a criterion field. The criterion field is a field of the selected list. The criterion field contains data used to identify data items in the selected list. The criterion value selection feature enables the user to select a criterion value.

After presenting the lookup dialog user interface, DWDA 504 receives list selection input from the user via the lookup dialog user interface (714). The list selection input indicates a selected list in the catalog of available lists. In addition, DWDA 504 receives target field selection input from the user via the lookup dialog user interface (716). The target field selection input indicates a target field in the selected list. DWDA 504 also receives criterion field selection input (718). The criterion field selection input indicates a criterion value.

After receiving the target list selection input, the target field selection input, the target criterion selection input and the target value selection input, DWDA 504 updates the workflow file such that the activity elements in the workflow file include a new activity element (722). The new activity element indicates the selected activity. The new activity element includes an attribute associated with the input property of the selected activity. The attribute specifies that the input property is to be bound to a value obtained by querying the selected list for values in the target field of a data item having the criterion value in its criterion field.

During execution of a workflow instance based on the workflow file, server computing system 106 invokes a query method of a list object that enables access to the selected list. Server computing system 106 provides a query as a parameter to the query method. The query selects the target field where the criterion field corresponds to the criterion value. In response to invoking the query method, server computing system 106 receives a target value. The target value is the value of the target field of a data item in the selected list, the criterion field of the data item specifying the criterion value. For example, database 112A may contain a list representing an employee directory. In this example, each data item in the list contains an identifier field, a name field, an e-mail field, and a role field. In this example, the user may select this list as the target list, select the e-mail field as the target field, select the role field as the criterion field, and may select the role "supervisor" as the criterion value. Given this query, the query method returns an e-mail address of an employee who has the role of "supervisor."

In the above example, DWDA 504 may update the workflow file to include the following activity element: "<SendEmailActivity to ="lookup: employee_list, e-mail_field, role_field, 'supervisor'" from="r.ochmonek@contoso.com">." In this example, the data selection input indicates the input property associated with the "to" attribute is to be bound to a value obtained by querying the "employee_list" list for a value in the "e-mail_field" field of a data item having the criterion value "supervisor" in its "role_field" field. In this example, the "SendEmailActivity" activity may send an email to an e-mail address bound to the input property associated with the "to" attribute. As a result of executing the "SendEmailActivity" activity, server computing system 106 may send an e-mail message to an employee who is a supervisor.

After updating the workflow file, DWDA 504 stores the workflow file at data storage system 108 at server computing system 106 (722). It should be appreciated that before DWDA 504 stores the workflow file to data storage system 108, the steps of operation 700 may be repeated an indefinite number of times to build a complete workflow.

Figure 8:
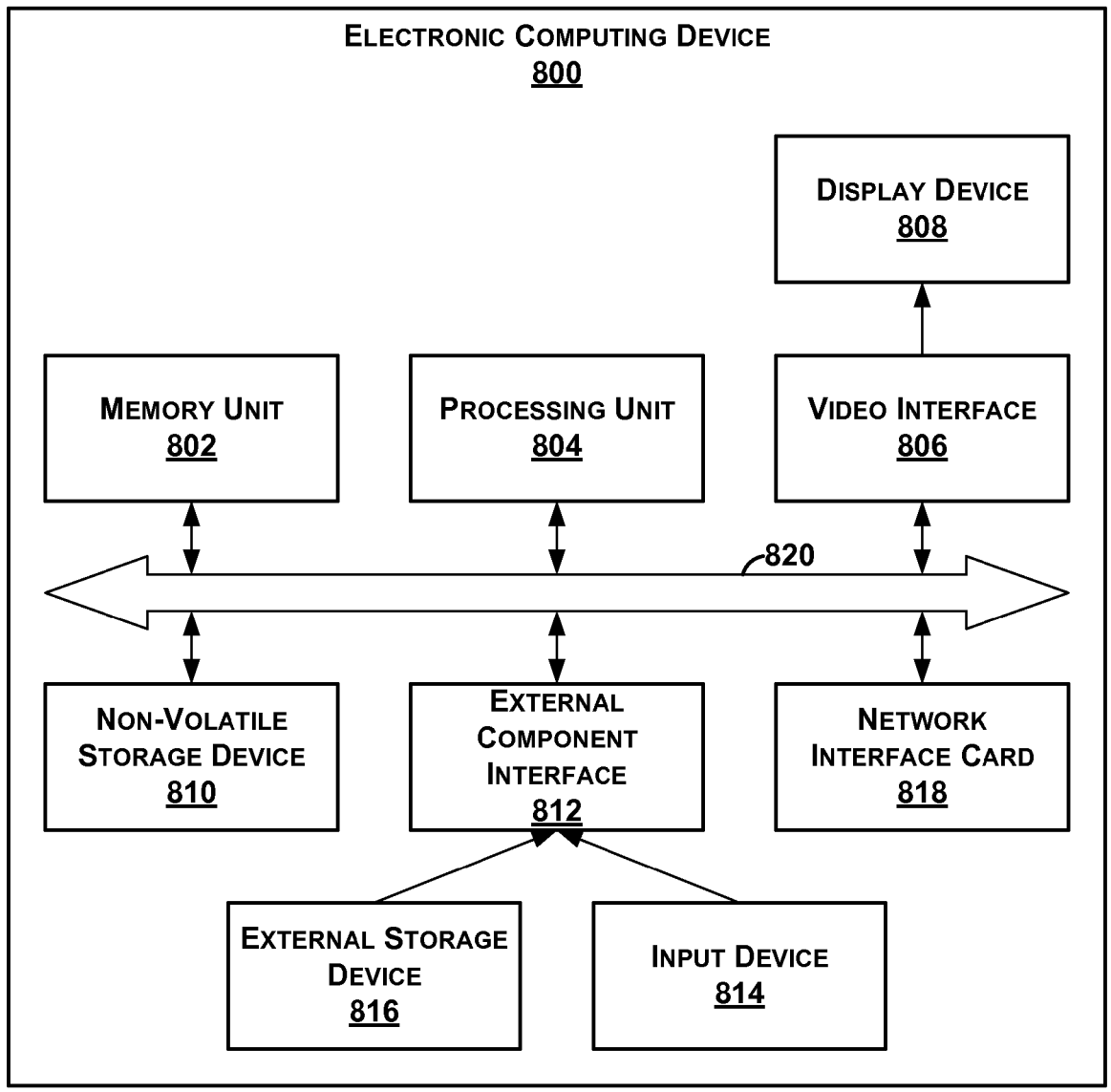
FIG. 8 is a block diagram illustrating example physical components of an electronic computing device.

FIG. 8 is a block diagram illustrating example physical components of an electronic computing device 800. As illustrated in the example of FIG. 8, electronic computing device 800 comprises a memory unit 802. Memory unit 802 is a computer-readable data storage medium capable of storing data and/or instructions. Memory unit 802 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 800 comprises a processing unit 804. As mentioned above, a processing unit is a set of one or more physical electronic integrated circuits that are capable of executing instructions. In a first example, processing unit 804 may execute software instructions that cause electronic computing device 800 to provide specific functionality. In this first example, processing unit 804 may be implemented as one or more processing cores and/or as one or more separate microprocessors. For instance, in this first example, processing unit 804 may be implemented as one or more Intel Core 2 microprocessors. Processing unit 804 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 804 may be implemented as an ASIC that provides specific functionality. In a third example, processing unit 804 may provide specific functionality by using an ASIC and by executing software instructions.

Electronic computing device 800 also comprises a video interface 806. Video interface 806 enables electronic computing device 800 to output video information to a display device 808. Display device 808 may be a variety of different types of display devices. For instance, display device 808 may be a cathode-ray tube display, an LCD display panel, a plasma screen display panel, a touch-sensitive display panel, a LED array, or another type of display device.

In addition, electronic computing device 800 includes a non-volatile storage device 810. Non-volatile storage device 810 is a computer-readable data storage medium that is capable of storing data and/or instructions. Non-volatile storage device 810 may be a variety of different types of non-volatile storage devices. For example, non-volatile storage device 810 may be one or more hard disk drives, magnetic tape drives, CD-ROM drives, DVD-ROM drives, Blu-Ray disc drives, or other types of non-volatile storage devices.

Electronic computing device 800 also includes an external component interface 812 that enables electronic computing device 800 to communicate with external components. As illustrated in the example of FIG. 8, external component interface 812 enables electronic computing device 800 to communicate with an input device 814 and an external storage device 816. In one implementation of electronic computing device 800, external component interface 812 is a Universal Serial Bus (USB) interface. In other implementations of electronic computing device 800, electronic computing device 800 may include another type of interface that enables electronic computing device 800 to communicate with input devices and/or output devices. For instance, electronic computing device 800 may include a PS/2 interface. Input device 814 may be a variety of different types of devices including, but not limited to, keyboards, mice, trackballs, stylus input devices, touch pads, touch-sensitive display screens, or other types of input devices. External storage device 816 may be a variety of different types of computer-readable data storage media including magnetic tape, flash memory modules, magnetic disk drives, optical disc drives, and other computer-readable data storage media.

In addition, electronic computing device 800 includes a network interface card 818 that enables electronic computing device 800 to send data to and receive data from an electronic communication network. Network interface card 818 may be a variety of different types of network interface. For example, network interface card 818 may be an Ethernet interface, a token-ring network interface, a fiber optic network interface, a wireless network interface (e.g., WiFi, WiMax, etc.), or another type of network interface.

Electronic computing device 800 also includes a communications medium 820. Communications medium 820 facilitates communication among the various components of electronic computing device 800. Communications medium 820 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Electronic computing device 800 includes several computer-readable data storage media (i.e., memory unit 802, non-volatile storage device 810, and external storage device 816). Together, these computer-readable storage media may constitute a single data storage system. As discussed above, a data storage system is a set of one or more computer-readable data storage mediums. This data storage system may store instructions executable by processing unit 804. Activities described in the above description may result from the execution of the instructions stored on this data storage system. Thus, when this description says that a particular logical module performs a particular activity, such a statement may be interpreted to mean that instructions of the logical module, when executed by processing unit 804, cause electronic computing device 800 to perform the activity. In other words, when this description says that a particular logical module performs a particular activity, a reader may interpret such a statement to mean that the instructions configure electronic computing device 800 such that electronic computing device 800 performs the particular activity.

The techniques of this disclosure may be realized in many ways. For example, the techniques of this disclosure may be realized as a method for deploying workflows. The method comprises a method for performing an automated business process. The method comprises storing a first database at a data storage system. In addition, the method comprises storing a second database at the data storage system, the first database having a different schema than the second database. The method also comprises initializing, at a server computing system, a workflow instance, the workflow instance being an instance of a workflow that facilitates performance by an enterprise of a business process. The business process is a structured set of tasks routinely performed by the enterprise to accomplish a specific business goal. The workflow instance comprises a plurality of activities. Each activity in the plurality of activities comprises a set of computer-executable code that when executed facilitates performance of a task in the business process. In addition, the method comprises initializing, at the server computing system, a list object. The list object is a software object enabling access to a list. The list comprises a data item collection. Each data item in the data item collection comprises an item key field specifying an item key. No two data items in the data item collection have item key fields specifying a shared item key. Each data item in the data item collection comprises a set of additional fields. Each field in the set of additional fields has a value derived from the first database or each field in the set of additional fields having a value derived from the second database. The list object implements an interface. The interface is the same regardless of whether fields in the set of additional fields have values derived from the first database or the second database. The item keys specified by the item key fields are of a same data type regardless of whether fields in the set of additional fields have values derived from the first database or the second database. The method also comprises initiating, at the server computing system, execution of the workflow instance. The server computing system initiates execution of the workflow instance after initializing the workflow instance and the list object. In addition, the method comprises accessing, at the server computing system, during execution of the workflow instance in response to executing one of the activities in the workflow instance, a data item in the list by invoking an access method of the list object. The access method is a member of the interface. The method also comprises completing, at the server computing system, execution of the workflow instance, thereby completing a cycle of the business process.

In another example, the techniques of this disclosure may be realized as an electronic computing system. The electronic computing system comprises a processing unit and a data storage system. The data storage system stores a first database and a second database. The first database has a different schema than the second database. The data storage system also stores a set of computer-executable instructions. When executed by the processing unit the instructions cause the electronic computing system to initialize a workflow instance. The workflow instance is an instance of a workflow that facilitates performance by an enterprise of a business process. The business process is a structured set of tasks routinely performed by the enterprise to accomplish a specific business goal. The workflow instance comprising a plurality of activities. Each activity in the plurality of activities comprises a set of computer-executable code that, when executed, facilitates performance of a task in the business process. The instructions also cause the electronic computing system to initialize a list object, the list object being a software object enabling access to a list. Each data item in the list comprises an item key field specifying an item key. No two data items in the list have item key fields specifying a shared item key. Each data item in the list comprises a set of additional fields. Each field in the set of additional fields having a value derived from the first database or each field in the set of additional fields having a value derived from the second database. The list object implements an interface. The interface is the same regardless of whether fields in the set of additional fields have values derived from the first database or the second database. The item keys are of a same data type regardless of whether fields in the set of additional fields have values derived from the first database or the second database. After initializing the workflow instance and the list object, the instructions cause the electronic computing system to initiate execution of the workflow instance. During execution of the workflow instance, the instructions cause the electronic computing system to access, in response to executing one of the activities in the workflow instance, a data item in the list by invoking an access method of the list object. The access method is a member of the interface. The instructions also cause the electronic computing system to complete execution of the workflow instance, thereby completing a cycle of the business process.

In another example, the techniques of this disclosure may be realized as a computer-readable data storage medium comprising computer-executable instructions that, when executed by a processing unit of an electronic computing system, cause the electronic computing system to store a first database at a data storage system. The instructions also cause the electronic computing system to store a second database at the data storage system, the second database having a different schema than the first database. In addition, the instructions cause the electronic computing system to display a workflow design user interface containing a catalog of available activities, the catalog of available activities including names of activities. Furthermore, the instructions cause the electronic computing system to receive activity selection input from a user via the workflow design user interface, the activity selection input indicating a selected activity selected by the user from the catalog of available activities. In addition, the instructions cause the electronic computing system to display, in response to receiving the activity selection input, a natural language sentence in the workflow design user interface, the natural language sentence describing a business process task facilitated by the selected activity, the natural language sentence including an input feature, the input feature enabling the user to bind data to an input property of the selected activity. The instructions also cause the electronic computing system to display a lookup dialog user interface containing a catalog of available lists, the available lists including a first list and a second list. The first list comprises a first data item collection, each data item in the first data item collection comprising an item key field, no two data items in the first data item collection having item key fields specifying a shared item key, each data item in the first data item collection comprising a first set of additional fields, each field in the first set of additional fields having a value stored in or derived from the first database. The second list comprises a second data item collection, each data item in the second data item collection comprising an item key field, no two data items in the second data item collection having item key fields specifying a shared item key, each data item in the second data item collection comprising a second set of additional fields, each field in the second set of additional fields having a value stored in or derived from the second database. The instructions also cause the electronic computing system to receive list selection input from the user via the workflow design user interface, the list selection input indicating a selected list, the selected list being one of the available lists. Furthermore, the instructions cause the electronic computing system to receive target field selection input from the user via the workflow design user interface, the target field selection input indicating a target field of the selected list. In addition, the instructions cause the electronic computing system to receive criterion field selection input from the user via the workflow design user interface, the criterion field selection input indicating a criterion field of the selected list. The instructions also cause the electronic computing system to receive criterion value selection input from the user via the workflow design user interface, the criterion value selection input indicating a criterion value. Moreover, after receiving the list selection input, the instructions cause the electronic computing system to the target field selection input, the criterion field selection input, and the criterion value selection input, store the workflow file at a data storage system, the workflow file containing a plurality of activity elements. Each activity element indicates an activity in a workflow that facilitates performance by an enterprise of a business process. The business process is a structured set of tasks routinely performed by the enterprise to accomplish a specific business goal. The plurality of activity elements includes a selected activity element that indicates the selected activity. The selected activity element has an attribute associated with the input property of the selected activity. The attribute specifies the target list, the target field, the criterion field, and the criterion item key. The instructions also cause the electronic computing system to initialize a workflow instance. The workflow instance comprises a plurality of activities. Each activity in the plurality of activities is indicated by an activity element in the plurality of activity elements in the workflow file. In addition, the instructions cause the electronic computing system to initialize a list object, the list object being a software object enabling access to the selected list, the list object implementing an interface, the interface being the same regardless of whether the selected list is the first list or the second list. The instructions also cause the electronic computing system to initiate execution of the workflow instance. Furthermore, during execution of the workflow instance, the instructions cause the electronic computing system to invoke a query method of the list object in response to executing the selected activity, the query method being a member of the interface. During execution of the workflow instance, the instructions also cause the electronic computing system to receive, in response to invoking the query method, a target value, the target value being the value of the target field of a first data item in the selected list, the criterion field of the first data item specifying the criterion value. Furthermore, during execution of the workflow instance, the instructions cause the electronic computing system to use the target value in response to executing the selected activity. In addition, the instructions cause the electronic computing system to complete execution of the workflow instance, thereby completing a cycle of the business process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for performing an automated business process, the method comprising:
    storing a first database at a data storage system;
    storing a second database at the data storage system, the first database having a different schema than the second database;
    displaying, by a design computing system, a workflow design user interface containing a catalog of available activities, the catalog of available activities including names of activities available to be included in a workflow;
    initializing, at a server computing system, a workflow instance, the workflow instance being an instance of the workflow that facilitates performance by an enterprise of a business process, the business process being a structured set of tasks routinely performed by the enterprise to accomplish a specific business goal, the workflow instance comprising a plurality of activities, each activity in the plurality of activities comprising a set of computer-executable code that when executed facilitates performance of a task in the business process;
    initializing, at the server computing system, a list object, the list object being a software object enabling access to a list, the list comprising a data item collection, each data item in the data item collection comprising an item key field specifying an item key, no two data items in the data item collection having item key fields specifying a shared item key, each data item in the data item collection comprising a set of additional fields, each field in the set of additional fields having a value derived from the first database or each field in the set of additional fields having the value derived from the second database, the list object implementing an interface, the interface being the same regardless of whether fields in the set of additional fields have values derived from the first database or the second database, the item keys specified by the item key fields being of a same data type regardless of whether fields in the set of additional fields have values derived from the first database or the second database;

receiving, at the design computing system, activity selection input from a user via the workflow design user interface, the activity selection input indicating a selected activity selected by the user from the catalog of available activity, displaying, by the design computing system in response to receiving the activity selection input, a natural language sentence in the workflow design user interface, the natural language sentence describing the task of the business process facilitated by the selected activity, the natural language sentence including an input feature inserted within the natural language sentence, the input feature enabling the user to directly bind data to an input property of the selected activity by entering input data into the input feature, and the input feature further enabling the user to indirectly bind data to the input property of the selected activity by designing a lookup query through a lookup dialog user interface displayed by the design computing system, wherein the design computing system selects input data based on the lookup query;

initiating, at the server computing system, after initializing the workflow instance and the list object, execution of the workflow instance;

accessing, at the server computing system, during execution of the workflow instance in response to executing one of the activities in the workflow instance, a data item in the list by invoking an access method of the list object, the access method being a member of the interface; and completing, at the server computing system, execution of the workflow instance, thereby completing a cycle of the business process.

2. The method of claim 1,
wherein the access method is a delete method; and
wherein accessing the data item comprises invoking the delete method, the server computing system.

3. The method of claim 1, wherein accessing the data item comprises modifying the data item.

4. The method of claim 1, wherein accessing the data item comprises adding the data item to the list.

5. The method of claim 1 further comprising:
during execution of the workflow instance prior to accessing the data item, initiating, by the server computing system, invoking a query method of the list object, wherein the server computing system initiates a query in response to executing the activity; and
during execution of the workflow instance, receiving, by the server computing system, the item key of the data item, wherein the server computing system receives the data item collection in response to executing the query method of the list object.

6. The method of claim 5, wherein the query is a Collaborative Application Markup Language (CAML) query.

7. The method of claim 1 further comprising:
displaying, by the design computing system, a catalog of available lists in the workflow design user interface, the available lists including the list;
receiving, at the design computing system, list selection input from the user via the workflow design user interface, the list selection input indicating a selected list, the selected list being one of the available lists;
receiving, at the design computing system, target field selection input from the user via the workflow design user interface, the target field selection input indicating a target field of the selected list;
receiving, at the design computing system, criterion field selection input from the user via the workflow design user interface, the criterion field selection input indicating a criterion field of the selected list;
receiving, at the design computing system, criterion value selection input from the user via the workflow design user interface, the criterion value selection input indicating a criterion value;
after receiving the list selection input, the target field selection input, the criterion field selection input, and the criterion value selection input, updating, by the design computing system, a workflow file to include an activity element, the workflow file defining the workflow, the activity element indicating the selected activity, the activity element having an attribute associated with the input property of the selected activity, the attribute specifying the selected list, the target field, the criterion field, and the criterion value; and
after updating the workflow file, storing the workflow file at the data storage system.

8. The method of claim 7, wherein initializing the workflow instance comprises instantiating each activity specified by the activity elements in the workflow file.

9. The method of claim 7 further comprising:
during execution of the workflow instance, invoking, at the server computing system, a query method of the list object, the query method being the member of the interface, wherein the server computing system invokes the query method in response to executing the selected activity;
during execution of the workflow instance, receiving, at the server computing system, a target value, the server computing system receiving the target value in response to executing the query method, the target value being the value of the target field of a first data item in the selected list, the criterion field of the first data item specifying the criterion value; and
during execution of the workflow instance, use the target value in response to executing the selected activity.

10. The method of claim 7, wherein the workflow file is an extensible markup language (XML) file.

11. The method of claim 7, wherein the selected list is an external list.

12. The method of claim 11, wherein external lists and actual lists are presented in the catalog of available lists such that the user cannot distinguish which lists in the catalog of available lists are external lists and which lists in the catalog of available lists are actual lists.

13. The method of claim 1, wherein the list is drawn from a table in the first database that does not include a unique key for each table row.

14. The method of claim 1, wherein the first database is a line-of-business database.

15. An electronic computing system comprising:
a processing unit; and
a data storage system, the data storage system storing:
a first database;
a second database, the first database having a different schema than the second database; and
a set of computer-executable instructions, the computer-executable instructions, when executed by the processing unit, cause the electronic computing system to:
display a workflow design user interface containing a catalog of available activities, the catalog of available activities including names of activities available to be included in a workflow;

initialize a workflow instance, the workflow instance being an instance of the workflow that facilitates performance by an enterprise of a business process, the business process being a structured set of tasks routinely performed by the enterprise to accomplish a specific business goal, the workflow instance comprising a plurality of activities, each activity in the plurality of activities comprising a set of computer-executable code that when executed facilitates performance of a task in the business process;

initialize a list object, the list object being a software object enabling access to a list, each data item in the list comprising an item key field specifying an item key, no two data items in the list having item key fields specifying a shared item key, each data item in the list comprising a set of additional fields, each field in the set of additional fields having a value derived from the first database or each field in the set of additional fields having the value derived from the second database, the list object implementing an interface, the interface being the same regardless of whether fields in the set of additional fields have values derived from the first database or the second database, the item keys being of a same data type regardless of whether fields in the set of additional fields have values derived from the first database or the second database;

receive activity selection input from a user via the workflow design user interface, the activity selection input indicating a selected activity selected by the user from the catalog of available activities;

display, in response to receiving the activity selection input, a natural language sentence in the workflow design user interface, the natural language sentence describing the task of the business process facilitated by the selected activity, the natural language sentence including an input feature, the input feature represented by an underscored blank, the input feature enabling the user to directly bind data to an input property of the selected activity by entering input data into the underscored blank, and the input feature further enabling the user to indirectly bind data to the input property of the selected activity by designing a lookup query through a lookup dialog user interface;

initiate, after initializing the workflow instance and the list object, execution of the workflow instance;

access, during execution of the workflow instance in response to executing one of the activities in the workflow instance, a data item in the list by invoking an access method of the list object, the access method being a member of the interface; and complete execution of the workflow instance, thereby completing a cycle of the business process.

16. The electronic computing system of claim 15, wherein the electronic computing system provides the item key as a parameter of the access method.

17. The electronic computing system of claim 15, the computer-executable instructions further causing the electronic computing system to:
initiate a query during execution of the workflow instance in response to executing a first activity in the workflow instance; and receive a data item collection in response to executing the first activity, the data item collection including the data item, each data item in the data item collection containing information responsive to the query.

18. The electronic computing system of claim 15, the computer-executable instructions further causing the electronic computing system to:
receive lookup dialog input from the user;
display, in response to receiving the lookup dialog input, the lookup dialog user interface containing a catalog of available lists, the available lists including the list;
receive list selection input from the user via the workflow design user interface, the list selection input indicating a selected list, the selected list being one of the available lists;
receive target field selection input from the user via the workflow design user interface, the target field selection input indicating a target field of the selected list;
receive criterion field selection input from the user via the workflow design user interface, the criterion field selection input indicating a criterion field of the selected list;
receive criterion value selection input from the user via the workflow design user interface, the criterion value selection input indicating a criterion value;
update a workflow file after receiving the list selection input, the target field selection input, the criterion field selection input, and the criterion value selection input, the electronic computing system updating the workflow file such that the workflow file includes an activity element, the workflow file defining the workflow, the activity element indicating the selected activity, the activity element having an attribute associated with the input property of the selected activity, the attribute specifying the selected list, the target field, the criterion field, and the criterion value;
store, after updating the workflow file, the workflow file at the data storage system;
during execution of the workflow instance, invoke a query method of the list object in response to executing the selected activity, the query method being the member of the interface;
during execution of the workflow instance, receive, in response to invoking the query method, a target value, the target value being the value of the target field of a first data item in the selected list, the criterion field of the first data item specifying the criterion value; and
during execution of the workflow instance, use the target value in response to executing the selected activity.

19. The electronic computing system of claim 17, wherein external lists and actual lists are presented in a catalog of available lists such that the user cannot distinguish which lists in the catalog of available lists are external lists and which lists in the catalog of available lists are actual lists.

20. A computer-readable data storage device comprising computer-executable instructions that, when executed by a processing unit of an electronic computing system, cause the electronic computing system to:
store a first database at a data storage system;
store a second database at the data storage system, the second database having a different schema than the first database;
display a workflow design user interface containing a catalog of available activities, the catalog of available activities including names of activities;
receive activity selection input from a user via the workflow design user interface, the activity selection input indicating a selected activity selected by the user from the catalog of available activities, display, in response to receiving the activity selection input, a natural language sentence in the workflow design user interface, the natural language sentence describing a business process task facilitated by the selected activity, the natural language sentence including an input feature, the input feature represented by an underscored blank, the input feature enabling the user to directly bind data to an input property of the selected activity by entering input data into the underscored blank, and the input feature further enabling the user to indirectly bind data to the input property of the selected activity by designing a lookup query;

display a lookup dialog user interface containing a catalog of available lists to enable the user to design the lookup query, the available lists including a first list and a second list, the first list comprising a first data item collection, each data item in the first data item collection comprising an item key field, no two data items in the first data item collection having item key fields specifying a shared item key, each data item in the first data item collection comprising a first set of additional fields, each field in the first set of additional fields having a value stored in or derived from the first database, the second list comprising a second data item collection, each data item in the second data item collection comprising the item key field, no two data items in the second data item collection having the item key fields specifying the shared item key, each data item in the second data item collection comprising a second set of additional fields, each field in the second set of additional fields having the value stored in or derived from the second database;

receive list selection input from the user via the workflow design user interface, the list selection input indicating a selected list, the selected list being one of the available lists;

receive target field selection input from the user via the workflow design user interface, the target field selection input indicating a target field of the selected list;

receive criterion field selection input from the user via the workflow design user interface, the criterion field selection input indicating a criterion field of the selected list;

receive criterion value selection input from the user via the workflow design user interface, the criterion value selection input indicating a criterion value;

after receiving the list selection input, the target field selection input, the criterion field selection input, and the criterion value selection input, store a workflow file at the data storage system, the workflow file containing a plurality of activity elements, each activity element indicating an activity in a workflow that facilitates performance by an enterprise of a business process, the business process being a structured set of tasks routinely performed by the enterprise to accomplish a specific business goal, the plurality of activity elements including a selected activity element that indicates the selected activity, the selected activity element having an attribute associated with the input property of the selected activity, the attribute specifying the selected list, the target field, the criterion field, and the criterion item key;

initialize a workflow instance, the workflow instance comprising a plurality of activities, each activity in the plurality of activities being indicated by the activity element in the plurality of activity elements in the workflow file;

initialize a list object, the list object being a software object enabling access to the selected list, the list object implementing an interface, the interface being the same regardless of whether the selected list is the first list or the second list;

initiate execution of the workflow instance;

during execution of the workflow instance, invoke a query method of the list object in response to executing the selected activity, the query method being a member of the interface;

during execution of the workflow instance, receive, in response to invoking the query method, a target value, the target value being the value of the target field of a first data item in the selected list, the criterion field of the first data item specifying the criterion value;

during execution of the workflow instance, use the target value in response to executing the selected activity; and complete execution of the workflow instance, thereby completing a cycle of the business process.

* * * * *